United States Patent Office 3,078,609
Patented Feb. 26, 1963

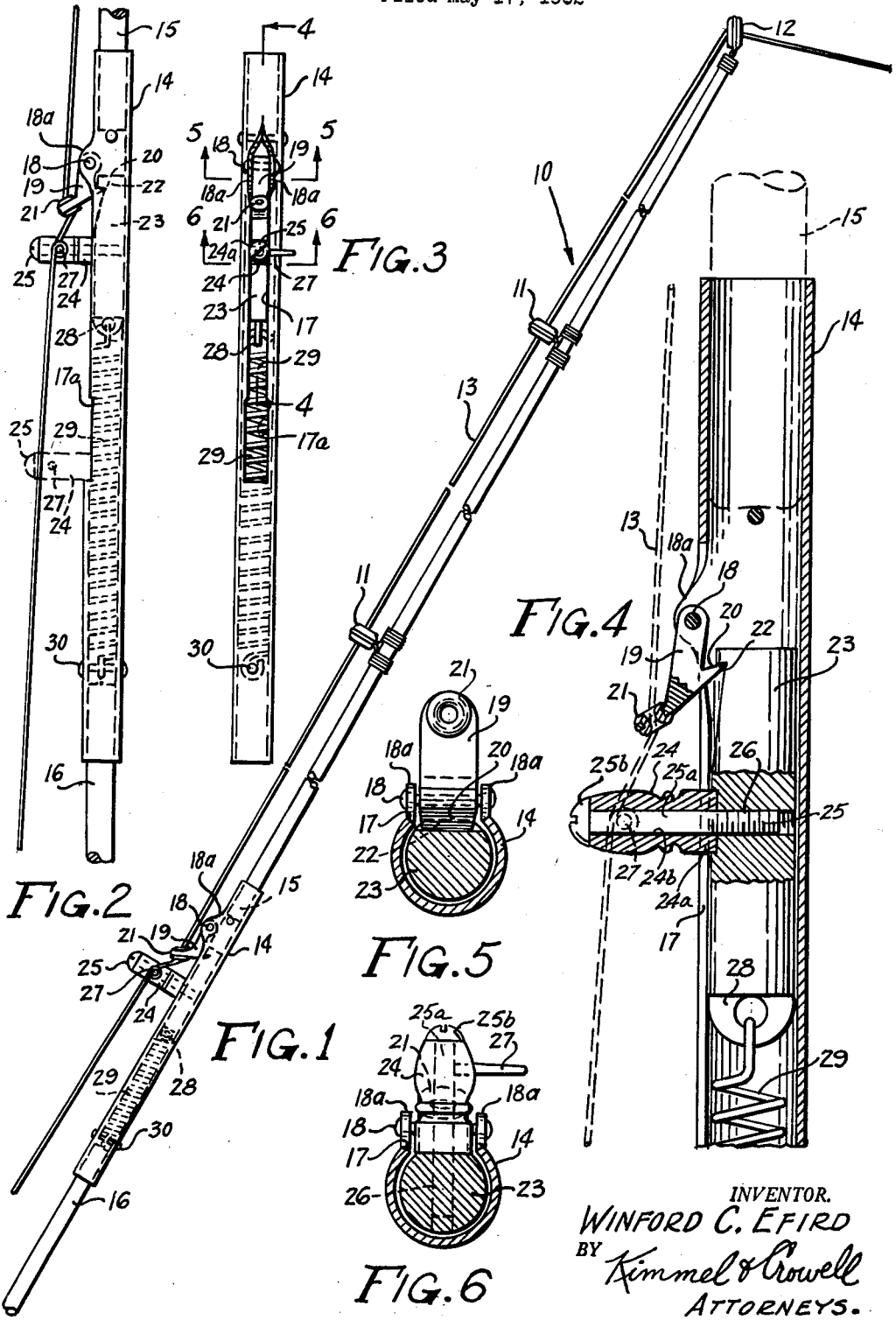

3,078,609
FISHHOOK SETTING DEVICE
Winford C. Efird, Box 291, Rte. 4, Albemarle, N.C.
Filed May 17, 1962, Ser. No. 196,570
1 Claim. (Cl. 43—15)

This invention relates to a fishhook setting device and comprises a continuation-in-part of my co-pending application Serial No. 115,166 entitled "Fishhook Setting Device," filed June 6, 1961, now abandoned.

A primary object of the invention is the provision of a device which may be attached to a conventional fishing pole which will set the hook in the mouth of a fish automatically upon a tug on the hook.

An additional object of the invention is the provision of a device of this character provided with a spring biased bolt having a post to which a portion of the line may be releasably attached, and a trigger mechanism so that a tug on the end of the line will release the trigger to permit the spring biased bolt to move rapidly backwards to set the hook in the mouth of a fish.

Still another object of the invention is the provision of a device of this character which is sturdy and durable in construction, reliable and efficient in operation, and relatively simple and inexpensive to manufacture, assemble, and utilize.

Still other objects reside in the combination of elements, arrangements of parts, and features of construction, all as will be more fully pointed out hereinafter and disclosed in the accompanying drawing wherein:

FIGURE 1 is a side elevational view of a fishing pole having the fishhook setting device of the instant invention incorporated therein.

FIGURE 2 is an enlarged detail side elevational view of the device shown in FIG. 1.

FIGURE 3 is a top plan view of the device of FIG. 2.

FIGURE 4 is an enlarged sectional view taken substantially along the line 4—4 of FIG. 3 as viewed in the direction indicated by the arrows.

FIGURE 5 is an enlarged sectional view taken substantially along the line 5—5 of FIG. 3 as viewed in the direction indicated by the arrow; and FIGURE 6 is an enlarged sectional view taken substantially along the line 6—6 of FIG. 3 as viewed in the direction indicated by the arrows.

Similar reference characters refer to similar parts throughout the several views of the drawing.

Having reference now to the drawings in detail, and more particularly to FIG. 1, there is generally indicated at 10 a conventional fishing pole provided with the usual line guides 11 and tip guide 12, through which extends a line 13. The device of the instant invention comprises a sleeve 14 having an open end into which the end 15 of the fishing pole section is inserted, the other end of the sleeve also being open and adapted for the reception of the handle portion of the fishing pole as indicated at 16. Sleeve 14 is provided along its upper surface with a slot or opening 17, which is closed adjacent one end by a pair of upstruck ears 18a. A pin 18 extending between the ears 18a mounts a trigger member 19 which includes a projection 20 and a line guiding eye 21. The projection 20 engages in a notch 22 of a bolt 23 which is slidable within the sleeve 14. Bolt 23 has rotatably mounted on the upper surface thereof a post 24 having a polygonal base 24a which is held in position by a screw 25 which extends into a threaded bore 26 in the bolt, screw 25 having a smooth portion 25a extending through a smooth bore 24b in post 24 and a head 25b, the post 24 having a transverse pin 27 extending from the side thereof.

Bolt 23 at one end is provided with an eye 28 to which is attached one end of a compression spring 29, the other end of spring 29 being connected to a rivet 30 which extends transversely across the sleeve adjacent its opposite end. The arrangement is thus such that when the line 13 is passed through the eye 21 and wound about the finger or projection 27, and the bolt moved to the position of FIG. 4 or 1, the trigger member 20 engages in the notch 22 to hold the bolt forwardly. Obviously, a pull on the line 13 from the end adjacent the tip guide 12 will exert pressure on the guide eye 21 to lift the detent 20 or finger out of the notch 22, whereupon the spring 29 will serve to pull the bolt and the associated post 24 and finger 27 quickly toward the handle of the pole, and thus effectively set the hook in the mouth of a fish.

As shown in FIG. 3, the slot 17 has a widened portion 17a at the end to which the post 24 is moved by spring 29 when a pull on the line 13 occurs. The polygonal base 24a of post 24 is of a dimension slightly less than the narrower portion of slot 17 to allow the same to be moved in the slot but not rotated. When the bolt 23 is moved toward the handle of the rod 16 by spring 29, the post 24 carried by bolt 23 moves into the portion 17a of the slot 17 having the wider dimension. The post 24 being freely mounted on the smooth portion 25a of screw 25 is then caused to rotate by the pull on the line 13 which is wound about finger 27. The finger 27 moves into substantial alignment with the pole 10 and the line 13 slips from finger 27 to allow the rod to be used in the usual manner.

From the foregoing it will now be seen that there is herein provided a fishhook setting device which accomplishes all the objects of this invention, and others, including many advantages of great practical utility.

As many embodiments may be made of this inventive concept, and as many modifications may be made in the embodiment hereinbefore shown and described, it is to be understood that all matter herein is to be interpreted merely as illustrative, and not in a limiting sense.

I claim:

A fishhook setting device comprising a sleeve interposed in the length of a fishing pole, said sleeve having portions defining a longitudinal slot therein, said slot having a relatively narrow dimension for a greater portion of its length and a wider dimension for the remaining portion of its length, spaced lugs at one end of said slot, a trigger pivoted between said lugs, a guide eye member on said trigger through which a fishing line is passed, a bolt in said sleeve, a post rotatably mounted on said bolt and extending outwardly through said slot, a finger on said post about which the fishing line is looped, a detent on said bolt engaged by said trigger, a spring biasing said bolt in a direction away from a hook on the end of the fishing line whereby a pull on said line will move said trigger to release said bolt and cause said post and finger to impart a jerk to the line to set the hook, said post movable substantially the full length of the said slot, and said post having a base dimension slightly less than the narrow dimension of said slot whereby said post is held against rotative movement for the greater portion of its travel but is rotatable when moved to the wider dimension of said slot to align said finger with the fishing pole to allow line looped around said finger to slip therefrom.

References Cited in the file of this patent

UNITED STATES PATENTS

| | | |
|---|---|---|
| 657,518 | Cook | Sept. 11, 1900 |
| 2,590,721 | Muth | Mar. 25, 1952 |
| 2,659,174 | Leach | Nov. 17, 1953 |
| 2,934,847 | Duff | May 3, 1960 |

FOREIGN PATENTS

| | | |
|---|---|---|
| 805,414 | Great Britain | Dec. 3, 1958 |